(12) United States Patent
Shikida (10) Patent No.: US 7,730,863 B2
(45) Date of Patent: Jun. 8, 2010

(54) WARM-UP APPARATUS FOR INTERNAL COMBUSTION ENGINE

(75) Inventor: Takasuke Shikida, Okazaki (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 575 days.

(21) Appl. No.: 11/662,571

(22) PCT Filed: Aug. 22, 2006

(86) PCT No.: PCT/JP2006/016379

§ 371 (c)(1),
(2), (4) Date: Mar. 12, 2007

(87) PCT Pub. No.: WO2007/023795

PCT Pub. Date: Mar. 1, 2007

(65) Prior Publication Data

US 2008/0135006 A1 Jun. 12, 2008

(30) Foreign Application Priority Data

Aug. 22, 2005 (JP) ............................. 2005-239875
Mar. 24, 2006 (JP) ............................. 2006-082342

(51) Int. Cl.
*F02N 17/02* (2006.01)

(52) U.S. Cl. .................... 123/142.5 R; 237/44; 237/11; 165/104.11; 123/41.14; 123/41.15

(58) Field of Classification Search .......... 123/142.5 R, 123/41.14, 41.15; 237/44, 11; 165/104.11, 165/10; 252/70

See application file for complete search history.

(56) References Cited

U.S. PATENT DOCUMENTS 5,378,337 A * 1/1995 Kiyomura ................ 204/230.3

(Continued)

FOREIGN PATENT DOCUMENTS

JP    61 185676    8/1986

(Continued)

*Primary Examiner*—Michael Cuff
*Assistant Examiner*—Hung Q Nguyen
(74) *Attorney, Agent, or Firm*—Oblon, Spivak, McClelland, Maier & Neustadt, L.L.P.

(57) ABSTRACT

An inexpensive warm-up apparatus for an internal combustion engine having a simple structure and eliminating the need of forming a hole in a heat storage material retainer or the need for a seal around the hole or an electrical circuit. A heat storage material retainer (14) accommodating a latent heat type heat storage material (X) is arranged in a water jacket (13). The heat storage material retainer (14) has a nucleation device (2) that accelerates phase transition of the heat storage material in a supercooled state. The nucleation device includes a nucleation portion (24) for nucleating the heat storage material (X) in the supercooled state for phase transition, a hammer (25) supported in a movable manner, a target member (23) for applying impact to the nucleation portion by abutting against the nucleation portion when the hammer moves forward, and a lock mechanism (26) for restraining the hammer in the standby position by making use of the volume increase that occurs as the heat storage material undergoes phase transition to the liquid phase when receiving heat. The lock mechanism is released by vibrations generated when the internal combustion engine is started. The lock mechanism causes the hammer to abut against the target member to activate the nucleation device and nucleate the heat storage material.

7 Claims, 9 Drawing Sheets

U.S. PATENT DOCUMENTS

| | | | | |
|---|---|---|---|---|
| 5,720,337 A | * | 2/1998 | Voss et al. | 165/10 |
| 5,749,329 A | * | 5/1998 | Thurfjell | 123/41.14 |
| 2005/0167079 A1 | * | 8/2005 | Zhang | 165/10 |

FOREIGN PATENT DOCUMENTS

| | | |
|---|---|---|
| JP | 63 105219 | 5/1988 |
| JP | 5-296017 | 11/1993 |
| JP | 06 264852 | 9/1994 |
| JP | 11 182393 | 7/1999 |

* cited by examiner

WARM-UP APPARATUS FOR INTERNAL COMBUSTION ENGINE

TECHNICAL FIELD

The present invention relates to a warm-up apparatus for warming an internal combustion engine by rapidly increasing the temperature in the internal combustion engine when starting the engine.

BACKGROUND ART

In general, when starting an internal combustion engine, if the internal temperature of the internal combustion engine, particularly, the cylinder wall temperature or the combustion chamber temperature, is low, friction loss occurs during movement of the piston and exhaust gas compositions deteriorates.

Therefore, in the prior art, a latent heat type heat storage material is accommodated in an internal combustion engine. There has been a proposal for a warm-up apparatus that stores heat generated by the operation of the internal combustion engine in the heat storage material and releases the heat stored in the heat storage material when the internal combustion engine is next started to accelerate warming of the internal combustion engine (refer to, for example, patent document 1).

A warm-up apparatus in the prior art includes a nucleation device having a pair of electrodes inserted into a heat storage material. Voltage is externally applied to the electrodes to activate the nucleation device. This nucleates the heat storage material, which is in a supercooled state, so as to accelerate phase transition and release heat from the heat storage material.

However, in the warm-up apparatus of the prior art, voltage is externally applied to the electrodes to accelerate the phase transition of the heat storage material. This requires insertion holes for inserting the electrodes into the heat storage material from the outer side and an electrical circuit for applying voltage to the electrodes. Therefore, an operation for forming holes extending through the heat storage material and seals arranged around the holes become necessary. Furthermore, an electrical circuit is also required. This inevitably increases the cost of the warm-up apparatus.

Patent Document 1: Japanese Laid-Open Patent Publication No. 11-182393

DISCLOSURE OF THE INVENTION

The present invention provides a warm-up apparatus for an internal combustion engine having a simple and inexpensive structure that eliminates the need for forming a hole extending through a heat storage material and eliminates the need for an electrical circuit or the arrangement of a seal around the hole.

A first aspect of the present invention provides a warm-up apparatus for an internal combustion engine. The warm-up apparatus includes a latent heat type heat storage material accommodated in the internal combustion engine, undergoing phase transition between a liquid phase including a super-cooled state and a solid phase, and increasing volume as temperature increases in the liquid phase. A nucleation device is arranged in the heat storage material and operated to accelerate phase transition of the heat storage material in the super-cooled state to release heat. The nucleation device includes a nucleation portion for nucleating and changing the phase of the heat storage material in the supercooled state. A hammer is movable toward the nucleation portion and away from the nucleation portion along a predetermined axial direction. A target member applies impact to the nucleation portion by abutting against the hammer when the hammer moves forward in a first direction along the axial direction. A spring urges the hammer in the first direction along the axial direction. The spring is compressed when the hammer moves backward in a second direction along the axial direction by making use of the increase in the volume of the heat storage material when heat is received from the internal combustion engine and phase transition from the solid phase to the liquid phase occurs. A lock mechanism restrains the hammer at a predetermined position in the axial direction in a state in which the spring is compressed when the temperature of the heat storage material in the liquid phase is low and the volume of the heat storage material is decreased. The lock mechanism is released by vibrations generated when the internal combustion engine is started so that the hammer is abutted against the target member by the urging force of the spring to apply an impact to the nucleation portion in order to activate the nucleation device and cause phase transition of the heat storage material in the supercooled state.

Further, a second aspect of the present invention provides a warm-up apparatus for an internal combustion engine. The warm-up apparatus includes a latent heat type heat storage material accommodated in the internal combustion engine, undergoing phase transition between a liquid phase including a supercooled state and a solid phase, and increasing volume as temperature increases in the liquid phase. A nucleation device is arranged in the heat storage material and operated to accelerate phase transition of the heat storage material in the supercooled state to release heat. The nucleation device includes a nucleation portion for nucleating and changing the phase of the heat storage material in the supercooled state. A hammer is movable toward the nucleation portion and away from the nucleation portion along a predetermined axial direction. The hammer applies impact to the nucleation portion when moving forward in a first direction along the axial direction. An air chamber urges the hammer in the first direction along the axial direction with air compressed therein. The air in the air chamber is compressed when the hammer is moved backward in a second direction along the axial direction by making use of the increase in the volume of the heat storage material when heat is received from the internal combustion engine and a phase transition occurs from the solid phase to the liquid phase. A lock mechanism restrains the hammer in a predetermined position along the axial direction in a state in which the air in the air chamber is compressed when the temperature of the heat storage material in the liquid phase is low and the volume of the heat storage material is decreased. The lock mechanism is released by vibrations generated when the internal combustion engine is started so that the hammer is abutted against the nucleation portion by the urging force of the air compressed in the air chamber to apply an impact to the nucleation portion in order to activate the nucleation device and cause phase transition of the heat storage material in the supercooled state.

According to the specified features of the first and second aspects of the invention, the lock mechanism for restraining the hammer in the predetermined position along the axial direction is released by vibrations generated when the internal combustion engine is started. The hammer applies impact to the nucleation portion to nucleate the heat storage material when the hammer is abutted against the target member by the urging force of the spring or when the hammer is abuts against the nucleation portion by the urging force of the air compressed in the air chamber. Therefore, the nucleation device is independently activated in the heat storage material in a supercooled state by vibrations generated when the internal combustion engine is started in order to accelerate the phase transition of the heat storage material. Accordingly, the discharge of heat from the heat storage material is smoothly performed by the nucleation device in the heat storage material. This provides an inexpensive warm-up apparatus having a simple structure.

Moreover, when the heat storage material receives heat from the internal combustion engine and undergoes phase transition from solid to liquid, the heat storage material increases volume. As a result, the hammer is moved backward in the second direction of the axial direction away from the target member or the nucleation portion and is restrained in the predetermined position along the axial direction even after the temperature of the heat storage material in the liquid phase becomes low and the volume of the heat storage material is decreased. Accordingly, even after the hammer is moved forward in the first direction of the axial direction to activate the nucleation device, the hammer may be moved in the second direction of the axial direction to prepare for activation of the nucleation device and be held to standby in the predetermined position by making use of heat from the internal combustion engine and causing the phase transition of the heat storage material without using additional members. This provides a significantly inexpensive warm-up apparatus having high efficiency.

In particular, the lock mechanism has the specified features described below.

The lock mechanism includes a vibrator arranged at the outer side of the hammer in a direction orthogonal to the axial direction and being swingable in the axial direction. An elastic body holds the vibrator in an equilibrium position located at the center of swing. The vibrator is moved away from the equilibrium position by being swung in the axial direction by vibrations generated when the internal combustion engine is started in order to release the hammer from restraint at the predetermined position.

According to this specified feature, the vibrator held in the equilibrium position by the elastic body at the outside of the hammer is released from the equilibrium position by vibrations generated when the internal combustion engine is started. The hammer is released from restraint in the predetermined position and the nucleation device is activated. Then, the phase transition of the heat storage material in the supercooled state is accelerated when the hammer is abutted against the target member in the heat storage material by the urging force of the spring or when the hammer is abutted against the nucleation portion in the heat storage material by the urging force of the compressed air in the air chamber. This ensures that heat is released from the heat storage material.

In particular, the lock mechanism and the vibrator have the specified features described below.

The lock mechanism includes a lock ball rollable in a direction orthogonal to the axial direction. The lock ball rolls between an engagement position where the lock ball is engaged with the hammer to restrain the hammer at the predetermined position and a disengagement position where the lock ball is disengaged from the hammer. The vibrator includes a projection projecting toward the hammer along a direction orthogonal to the axial direction. The projection restrains the hammer in the predetermined position by abutting against and holding the lock ball at the engagement position when the vibrator is held at the equilibrium position, and the projection releases the hammer from restraint at the predetermined position by disengaging the lock ball from the projection and rolling the lock ball to the disengagement position when the vibrator is moved away from the equilibrium position by vibrations generated when the internal combustion engine is started.

According to these specified features, the lock ball, which is engaged with the hammer in the engagement position by abutting against the projection of the vibrator in the predetermined position to restrain the hammer, is released from the projection when moved away from the equilibrium position by the vibrator when vibrations are generated when the internal combustion engine is started. This rolls the lock ball to the release position. As a result, the hammer is released from the restraint in the predetermined position and the nucleation device is activated. The phase transition of the heat storage material in the supercooled state is accelerated by the hammer abut against the target member in the heat storage material by the urging force of the spring, or the hammer abut against the nucleation portion in the heat storage material by the urging force of the compressed air in the air chamber. This ensures the release of heat from the heat storage material.

Further, the air chamber includes either an air bag having air sealed therein or a copper bellows. When using the air chamber, the hermetic seal of the air chamber is easily obtained, and urging force is smoothly applied to the hammer.

BEST MODE FOR CARRYING OUT THE INVENTION

A warm-up apparatus for an internal combustion engine 1 according to a first embodiment of the present invention will be described in detail with reference to the drawings.

Figure 1:
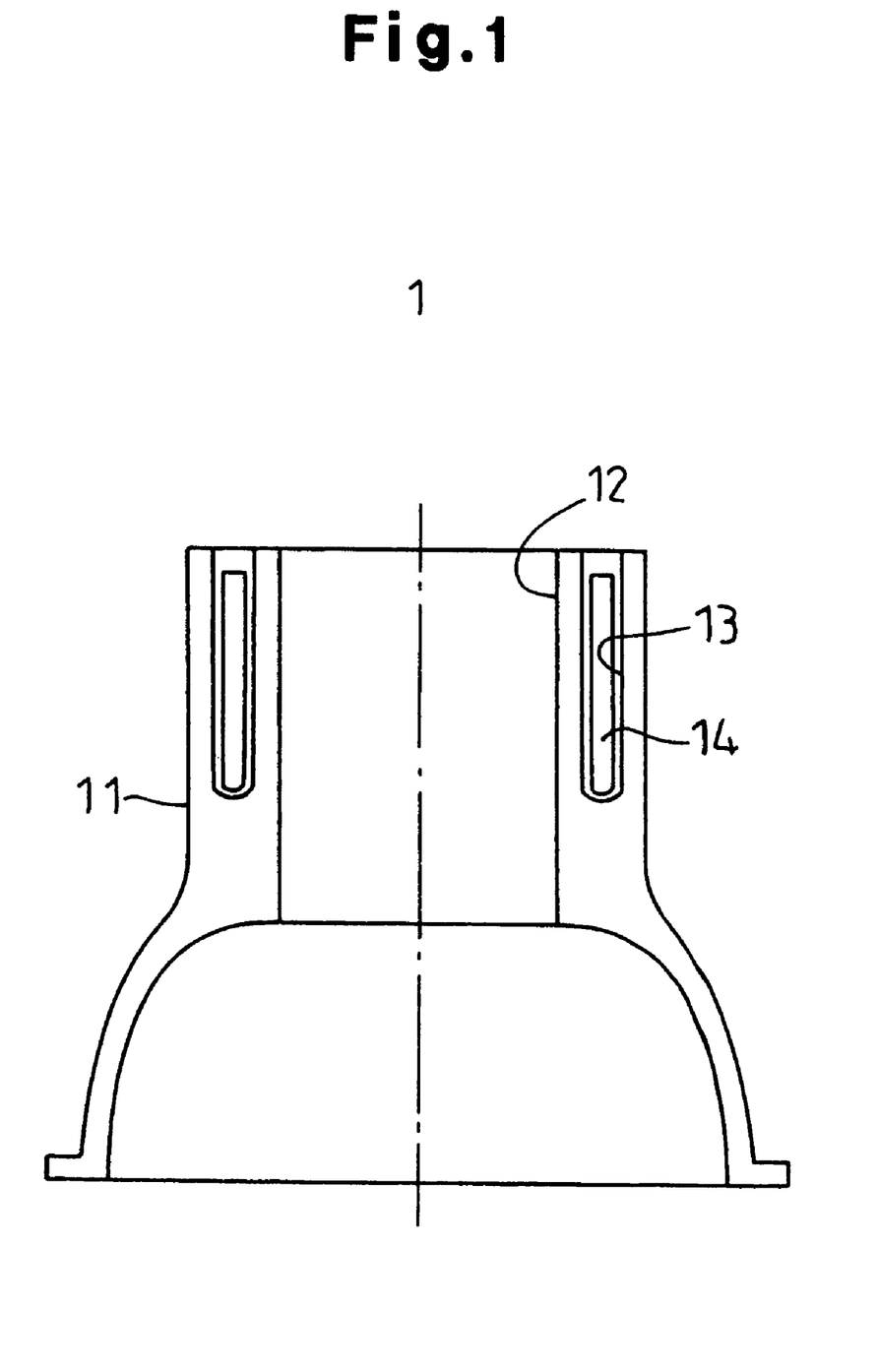
FIG. 1 is a schematic cross-sectional view showing an internal combustion engine incorporating a warm-up apparatus according to a first embodiment of the present invention from the direction of a crankshaft.
Figure 2:
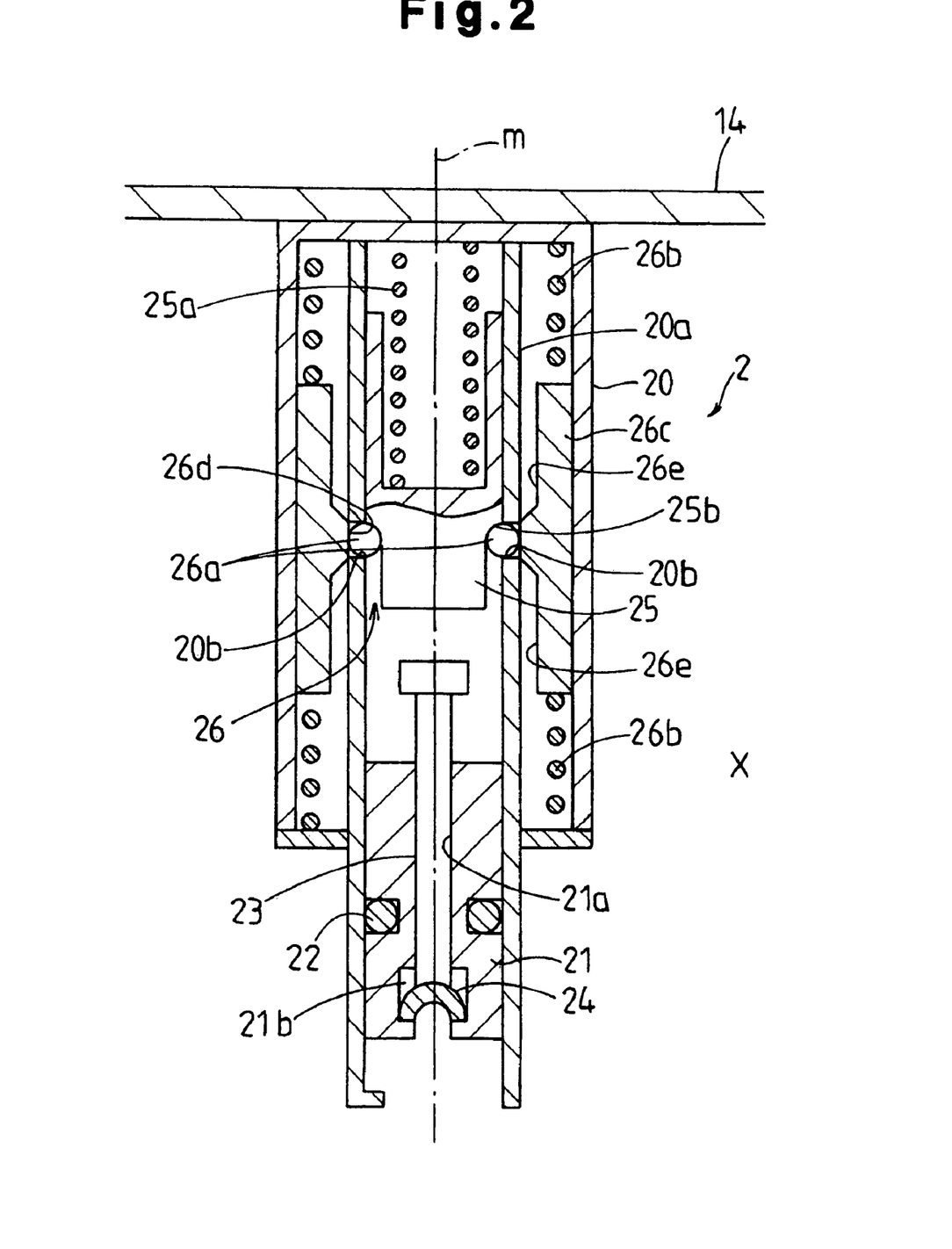
FIG. 2 is a schematic cross-sectional view of a nucleation device accommodated in a heat storage material retainer of the warm-up apparatus shown in FIG. 1.

FIG. 1 is a cross-sectional view showing the internal combustion engine 1 having a warm-up apparatus according to the first embodiment as viewed from a crankshaft. The internal combustion engine 1 has a cylinder block 11 in which a water jacket 13 is formed surrounding a cylinder 12. The water jacket 13 accommodates a heat storage material retainer 14 filled with a latent heat type heat storage material X formed from for example, sodium acetate trihydrate ($CH_3COONa.3H_2O$). The heat storage material retainer 14 is formed of a synthetic resin having high thermal conductivity. Sodium acetate trihydrate used as the heat storage material X has characteristics in which phase transition will not occur from a liquid phase to a solid phase even if cooled from a temperature exceeding the melting point (58° C.) to a temperature equal to or lower than the melting point and thereby maintaining a supercooled state while storing latent heat of about minus 20° C. to minus 30° C. As shown in FIG. 2, a nucleation device 2, which operates to accelerate the phase transition of the heat storage material X, is arranged in the heat storage material retainer 14. Activation of the nucleation device 2 with vibrations generated when starting the internal combustion engine 1 in a state in which the temperature of the internal combustion engine 1 is low and the heat storage material X is supercooled will accelerate phase transition of the heat storage material X to the solid phase and rapidly release the latent heat. After the release of latent heat caused by the phase transition to the solid phase is completed, when receiving heat from the cylinder block 11, the heat storage material X undergoes phase transition to the liquid phase as the temperature becomes higher than the melting point, stores latent heat, and increases its volume as the temperature increases.

Figure 3:
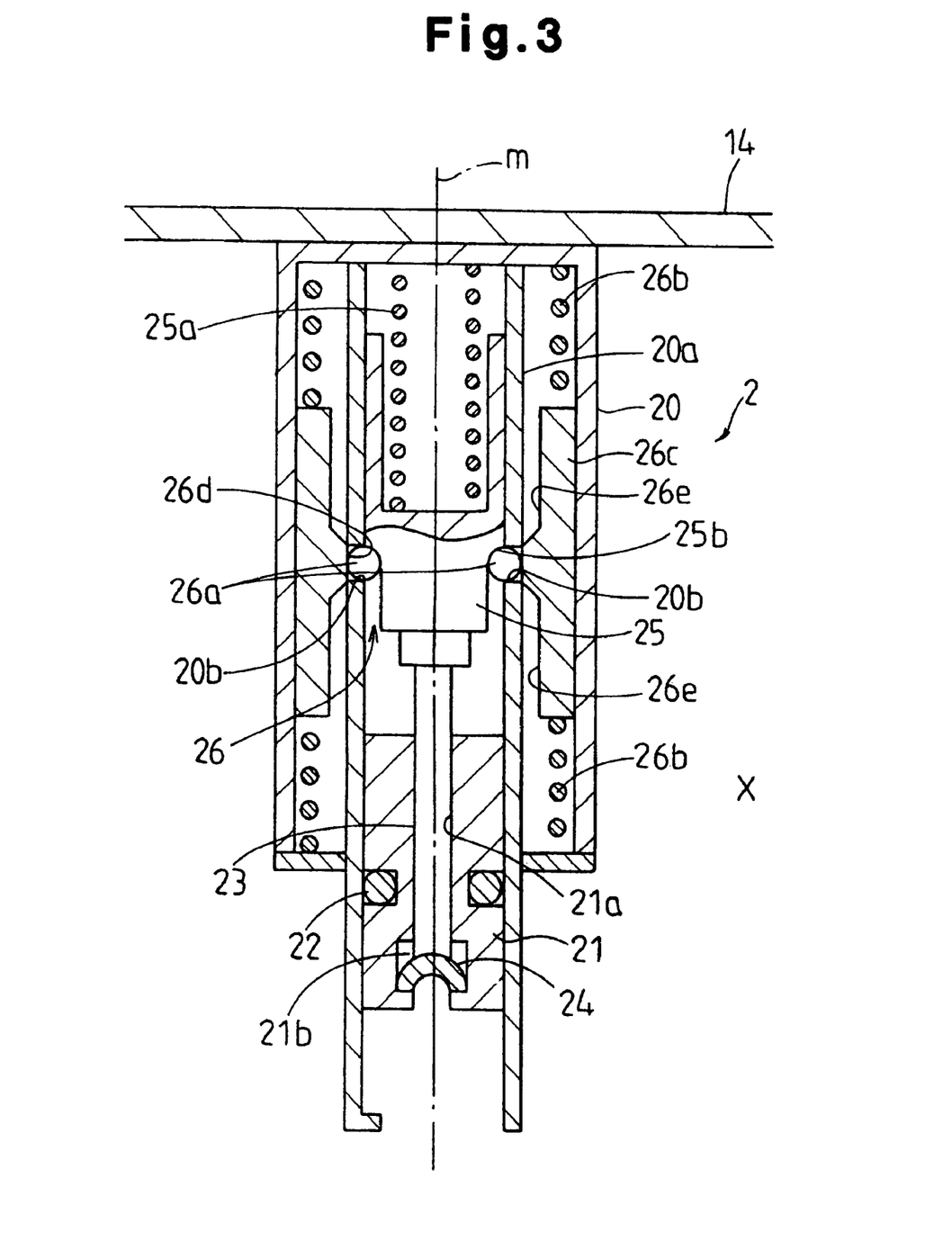
FIG. 3 is a schematic cross-sectional view of a nucleation device showing a standby state of a hammer which is restrained in a standby position due to volume expansion of the heat storage material shown in FIG. 2.

As shown in FIG. 2, the nucleation device 2 includes a frame 20, which is cylindrical and has a closed end. The frame 20 has an upper end face attached to the upper surface of the heat storage material retainer 14. A cylinder 20a, which is cylindrical, has an upper end attached to the upper end face of the frame 20 and a lower end face open into the heat storage material retainer 14. The nucleation device 2 further includes a piston 21 in a lower part of the interior of the cylinder 20a. The piston 21 is supported in a slidable manner in the direction of axis m and has a hole 21a extending through the center in the direction of axis m. A shaft-shaped target member 23 is supported in a slidable manner in the hole 21a of the piston 21. The nucleation device 2 further includes an O-ring 22, which seals the space between the piston 21 and the cylinder 20a, and a bowl-shaped nucleation portion 24, which is attached to the lower end of an open portion 21b. The open portion 21b is substantially box-shaped and formed in a lower end part of the piston 21. The nucleation portion 24 is nucleated by the impact applied when struck by the lower face of the target member 23. The nucleation device 2 further includes a hammer 25 which is supported in an upper part (above the piston 21) of the interior of the cylinder 20a in a manner slidable in the direction of the axis m. The hammer 25 applies impact to the nucleation portion 24 to nucleate the heat storage material X when abut against the upper surface of the target member 23. An urging spring 25a is arranged in a compressed state between the hammer 25 and the upper inner surface of the frame 20 so as to urge the hammer 25 downward (in a direction for abutting against the target member 23). The target member 23 is held in a state abut against the upper surface of the nucleation portion 24. The lower surface of the target member 23 is in contact with the heat storage material X in the heat storage material retainer 14. As shown in FIG. 3, when the heat storage material X undergoes phase transition from solid to liquid and increases its volume as heat is received from the cylinder block 11, the piston 21 moves upward together with the target member 23 until the piston 21 abuts against the hammer 25. Thus, the hammer 25 moves to the standby position (the position shown in FIG. 3) against the urging force of the urging spring 25a. In contrast, when the temperature of the heat storage material X in the liquid phase is lowered and the volume of the heat storage material X is decreased, the piston 21 moves downward together with the target member 23 so as to space the target member 23 from the hammer 25.

The nucleation device 2 further includes a lock mechanism 26 for restraining the hammer 25 in the standby position. The lock mechanism 26 includes the urging spring 25a, which urges the hammer 25 downward, and lock balls 26a, which are arranged in the wall surface of the cylinder 20a and supported in a rollable manner in holes 20b extending in a radial direction that is orthogonal to axis m. The lock balls 26a slide in the holes 20b between a radially inner engagement position (position shown in FIGS. 2 and 3) in which the lock balls 26a engage with a shoulder 25b of the hammer 25 in the standby position of the hammer 25 and a radially outer disengagement position (position shown in FIG. 4) in which the lock balls 26a are disengaged from the shoulder 25b of the hammer 25. The lock mechanism 26 further includes a vibrator 26c which is held in equilibrium between the frame 20 and the cylinder 20a by urging force from a pair of upper and lower urging springs 26b and 26b so as to be movable in the direction of the axis m. The vibrator 26c is released from the equilibrium state (the position shown in FIGS. 2 and 3) established by the urging springs 26b by vibrations generated when the internal combustion engine 1 is started so as to swing in the direction of the axis m relatively to the internal combustion engine 1. A projection 26d is formed at an axially central position on the inner peripheral surface of the vibrator 26c. The projection 26d projects radially inward to press the lock balls 26a at the equilibrium position determined by the urging springs 26b and 26b. The projection 26d slides along the outer surface of the cylinder 20a when the vibrator 26c swings in the direction of the axis m. When the vibrator 26c is held in the equilibrium position, the projection 26d abuts against the lock ball 26a to hold the lock ball 26a in the engagement position. This restrains the hammer 25 in the standby position. When the vibrator 26c is released from the equilibrium position by the vibrations generated when the internal combustion engine 1 is started, the projection 26d is separated from the lock balls 26a. Thus, the lock balls 26a roll to the disengagement position. The hammer 25 is thus released from the standby position. Additionally, upper and lower releasing portions 26e, 26e are respectively provided on the upper and lower sides of the projection 26d of the vibrator 26c to allow the lock balls 26a to roll to the disengagement position.

Figure 4:
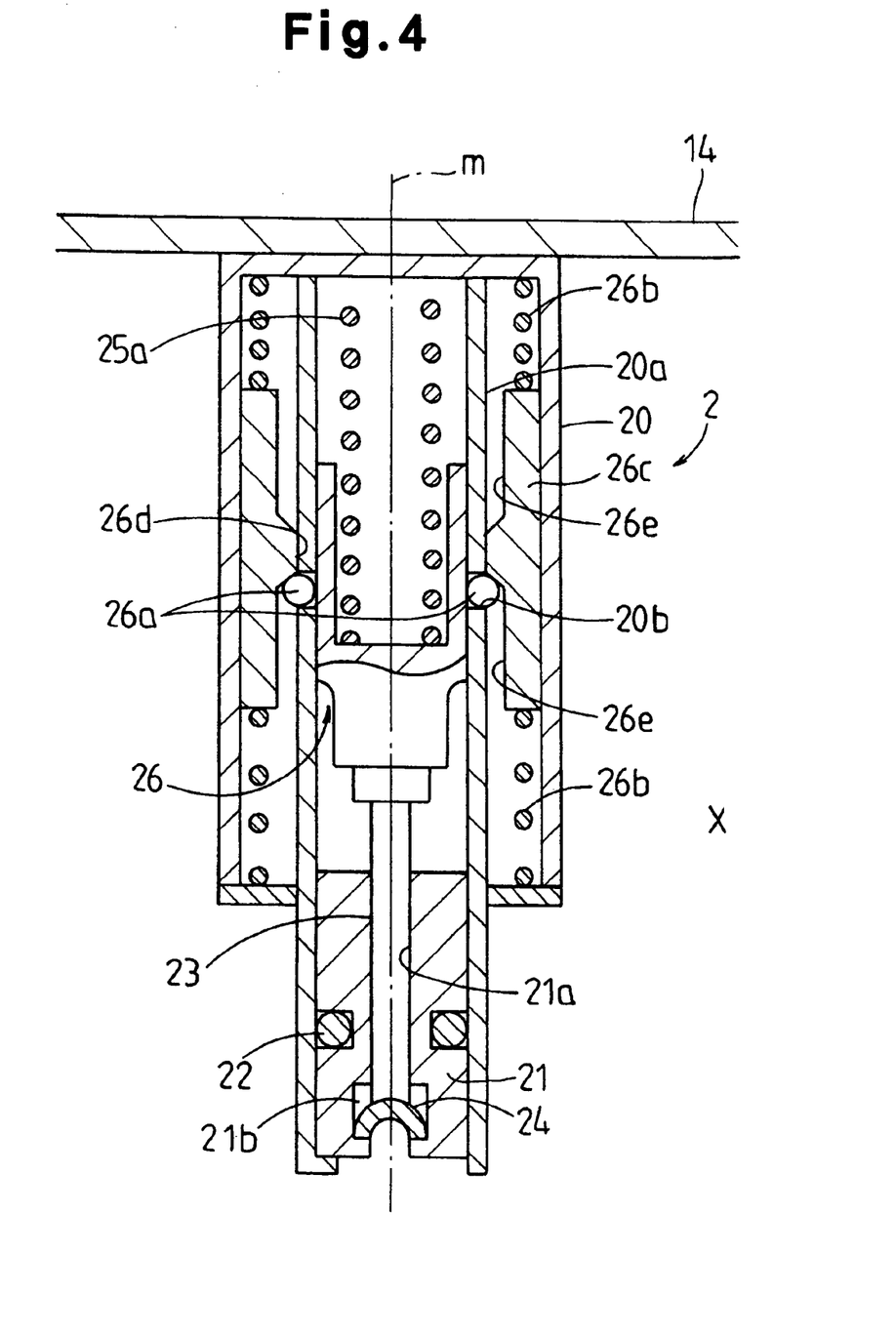
FIG. 4 is a schematic cross-sectional view of the nucleation device showing a nucleating state of the heat storage material of FIG. 2 immediately after starting the engine.

As shown in FIG. 2, the nucleation portion 24 is bowl-shaped and formed so as to bulge toward the hammer 25. A plurality of cracks (not shown) filled with crystals of the heat storage material X are formed in the nucleation portion 24 at the side opposite from the hammer 25 (the lower surface as viewed in FIG. 2). Referring to FIG. 4, the nucleation device 2 is activated by vibrations generated when the internal combustion engine 1 is started. More specifically, when the vibrator 26c is released from the equilibrium position by the vibrations generated when the internal combustion engine 1 is started, the lock balls 26a roll to the disengagement position. The hammer 25, which is released from the standby position, moves downward and abuts against the nucleation portion 24 with the target member 23 arranged in between. The nucleation device 2 is activated in this manner and the cracks on the rear side (the lower surface) of the nucleation portion 24 are opened by the abutment of the hammer 25. As a result, the crystals of the heat storage material X remaining in the cracks come into direct contact with the heat storage material X or nascent metal surfaces in the cracks come into direct contact with the heat storage material X. This nucleates the heat storage material X. In this case, the nucleation device 2 is installed with the axis m oriented substantially vertically so that the vibrations generated when the internal combustion engine 1 is started easily releases the hammer 25 from the restraint in the standby position imposed by the lock mechanism 26, that is, so that the vibrator 26c can easily be released from the equilibrium position.

Accordingly, in the first embodiment, the lock balls 26a roll from the engagement position for engaging the shoulder 25b of the hammer 25 to the disengagement position when the vibrator 26c is separated from the equilibrium position by the vibrations generated when the internal combustion engine 1 is started. The hammer 25 then advances from the standby position to abut against the target member 23 and opens the cracks on the rear side of the nucleation portion 24. As a result, the crystals of the heat storage material X remaining in the cracks come into direct contact with the heat storage material X or the nascent metal surfaces in the cracks come into direct contact with the heat storage material X. This nucleates the heat storage material X. In the first embodiment, the nucleation device 2 is arranged in the heat storage material retainer 14, which retains the heat storage material X. This provides a warm-up apparatus having an inexpensive and simple structure. Thus, unlike the warm-up apparatus of the prior art, the present invention eliminates the need of an electrical circuit for applying voltage to electrodes inserted into a heat storage material to accelerate phase transition of a heat storage material that is in a supercooled state. Moreover, the present invention also eliminates the need of holes for insertion of electrodes in a heat storage material retainer containing the heat storage material. This further eliminates operations for forming the holes in the heat storage material retainer 14 and the need of arranging seals around the holes. Accordingly, the first embodiment provides a warm-up apparatus having a simple and inexpensive structure.

The heat storage material X receives heat from the cylinder block 11 and undergoes phase transition from solid to liquid thereby increases its volume. This moves the piston 21 upward and moves the hammer 25 back to the standby position. Afterwards, the hammer 25 is restrained in the standby position by the lock mechanism 26 even if the temperature of the heat storage material X in the liquid phase decreases and reduces the volume of the heat storage material X. Therefore, after the hammer 25, which nucleates the nucleation portion 24 and activates the nucleation device 2, is moved downward to the position where the hammer 25 abuts against the target member 23, no additional members have to be used to return the hammer 25 to the standby position and prepare it to activate the nucleation device 2 by using the phase transition of the heat storage material X and the heat from the cylinder block 11. Accordingly, the first embodiment provides a significantly inexpensive but highly efficient nucleation device 2.

A second embodiment of the present invention will be described with reference to FIG. 5.

In the second embodiment, the structure of the nucleation device is partially modified. Except for these parts, the remaining structure is the same as that of the first embodiment. The same components are denoted by the same reference numerals and will not be described in detail.

Figure 5:
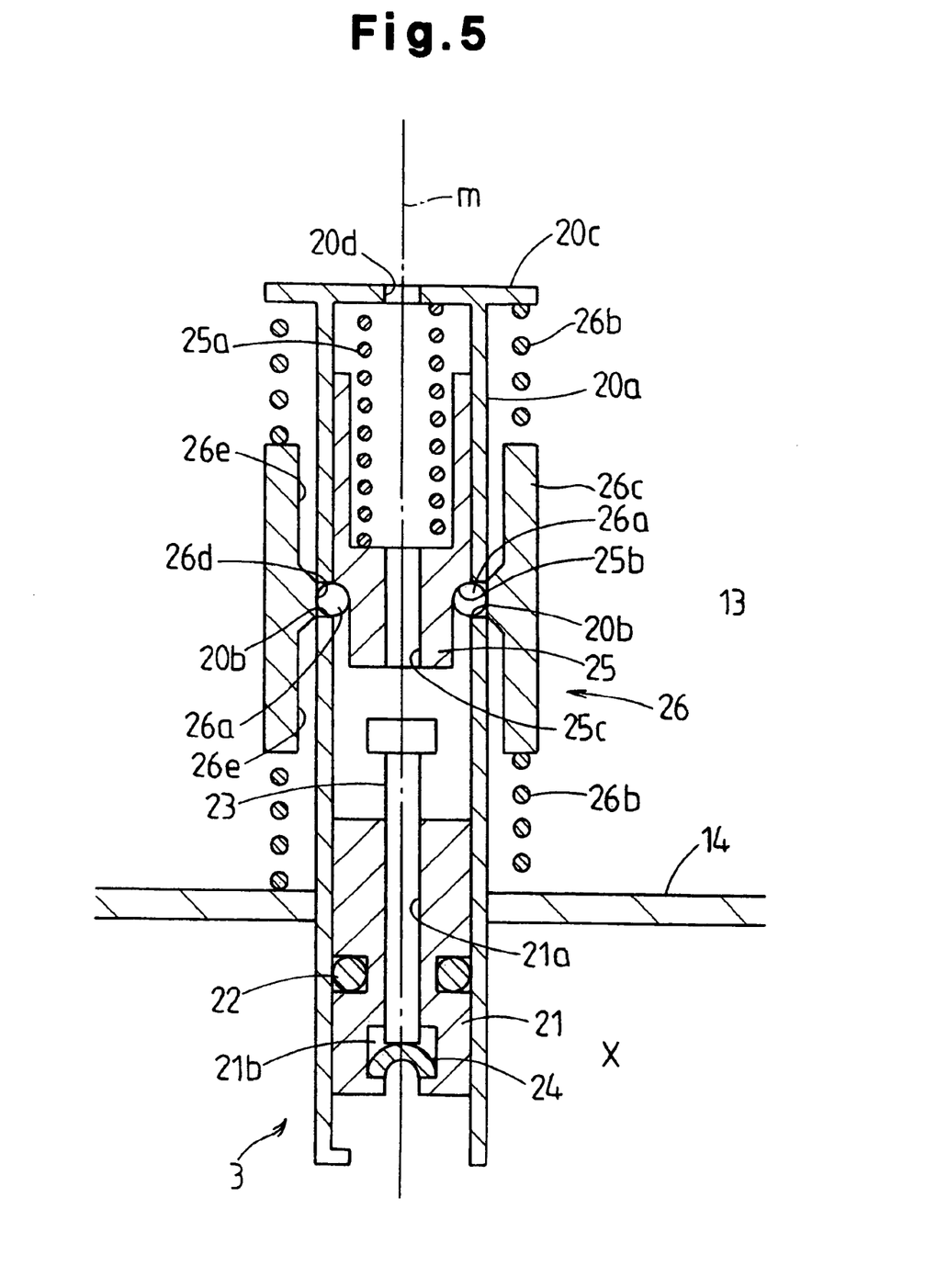
FIG. 5 is a schematic cross-sectional view showing a nucleation device according to a second embodiment of the present invention.

As shown in FIG. 5, in a nucleation device 3 of the third embodiment, the cylinder 20a has an upper portion, which is exposed inside the water jacket 13, and a substantially central portion with respect to the direction of the axis m of the cylinder 20a attached to extend across the water jacket 13 and the heat storage material retainer 14. The nucleation device 3 has an outer frame that is cutaway so that the cylinder 20a is in contact with coolant. A disk-shaped plate 20c having a larger diameter than the cylinder 20a is integrally attached to the upper end of the cylinder 20a.

The plate 20c at the upper end of the cylinder 20a and the hammer 25 respectively have holes 20d and 25c extending through their centers in the direction of the axis m. Accordingly, the axial movement of the hammer 25 is not inhibited by the coolant in the water jacket 13, and the hammer 25 moves smoothly. In this case, the vibrator 26c is held in equilibrium in a state movable in the direction of the axis m between the plate 20c at the upper end of the cylinder 20a and the upper surface of the heat storage material retainer 14, by urging forces applied by a pair of upper and lower urging springs 26b and 26b. The vibrator 26c is released from the equilibrium state (the position shown in FIG. 5) established by the urging springs 26b by vibrations generated when the internal combustion engine 1 is started and swings in the direction of the axis m relatively to the internal combustion engine 1.

Accordingly, in the second embodiment, when the vibrator 26c is released from the equilibrium position by vibrations generated when the internal combustion engine 1 is started, the lock ball 26a rolls from the engagement position engaging with the shoulder 25b of the hammer 25 to the disengagement position. As a result, the hammer 25 smoothly moves downward from the standby position without any adverse effect from the coolant and abuts against the target member 23. This opens the cracks on the rear of a nucleation portion 24. Thus, crystals of the heat storage material X remaining in the cracks come into direct contact with the heat storage material X or nascent metal surfaces in the cracks come into direct contact with the heat storage material X to nucleate the heat storage material X. In the second embodiment, the lower portion of the nucleation device 3 (the portion at the side of the nucleation portion 24) is arranged in the heat storage material retainer 14. Therefore, in the same manner as the first embodiment, the second embodiment provides an inexpensive warm-up apparatus having a simple structure.

A third embodiment of the present invention will be described with reference to FIG. 6.

In the third embodiment, the piston member and the target member are modified. Except for the piston member and the target member, the remaining structure is the same as that of the first embodiment. The same components are denoted by the same reference numerals and will not be described in detail.

Figure 6:
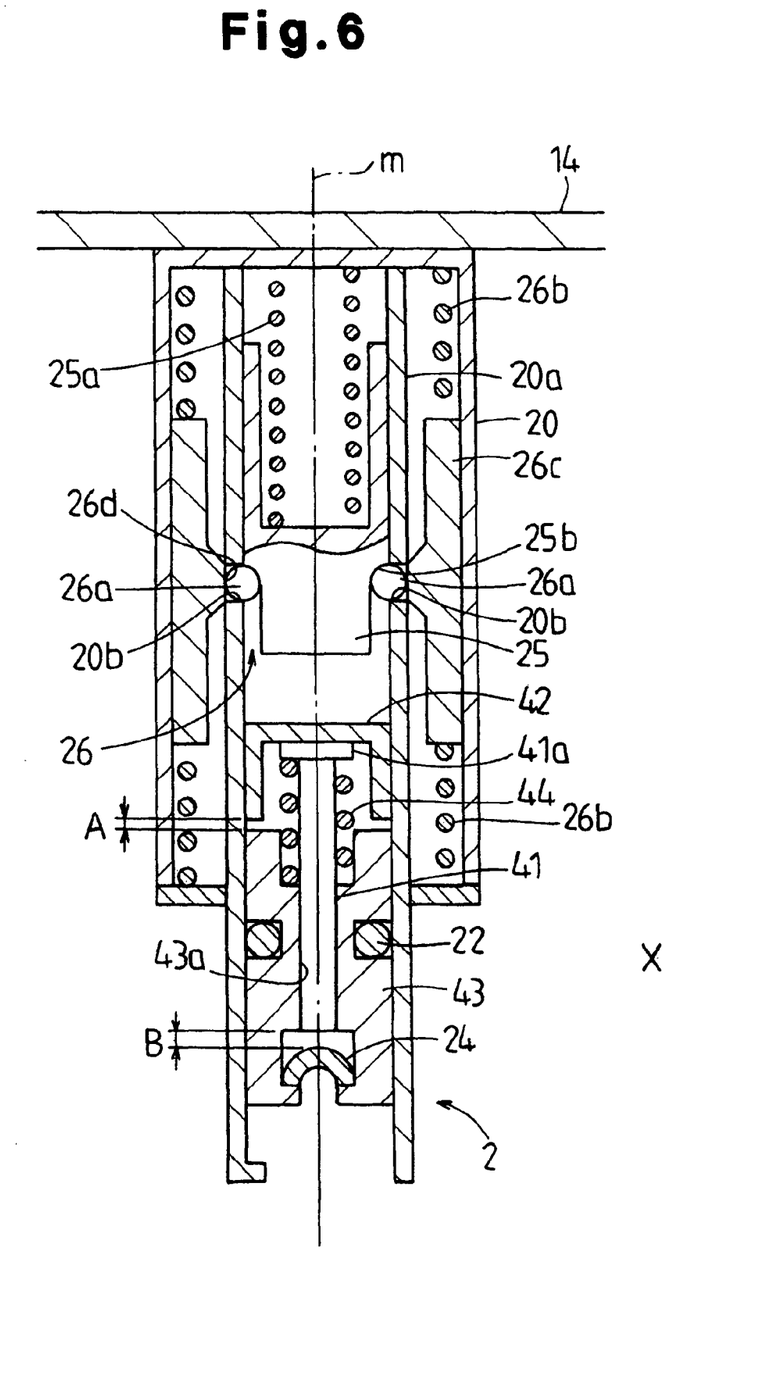
FIG. 6 is a schematic cross-sectional view showing a nucleation device according to a third embodiment of the present invention.

In the third embodiment, as shown in FIG. 6, a piston 43 is supported in a slidable manner in a lower part of the cylinder 20a. A hole 43a extends through the center of the piston 43 in the direction of the axis m. A shaft-shaped target member 41 is supported in a slidable manner in the hole 43a of the piston 43. A cap member 42, which is cylindrical and has a closed end, is supported in a slidable manner in the cylinder 20a so as to cover the upper surface of the target member 41. An urging spring 44 is arranged in a compressed state between a large-diameter portion 41a formed at the upper end of the target member 41 and the upper surface of the piston 43 so as to urge the target member 41 upward from the piston 43. The urging spring 44 ensures a gap B between the target member 41 and the upper surface of the nucleation portion 24, while ensuring a gap A between the upper surface of the piston 43 and the lower end of the cap member 42, which is pushed upward by the large-diameter portion 41a at the upper end of the target member 41. In this case, gap A is set to be smaller than gap B (A<B).

When the heat storage material X receives heat from the cylinder block 11 after undergoing phase transition from solid to liquid and increases its volume (for example, by about 10%), the piston 43 moves upward. Then, the lower surface of the cap member 42 comes into contact with the upper surface of the piston 43 against the urging force of the urging spring 44 so as to close the gap (A=0). At the same time, the target member 41 moves downward to narrow the gap B between the nucleation portion 24 and the target member 41. In this state, the hammer 25 is moved back to the standby position. The hammer 25 is then restrained in the standby position by the lock mechanism 26. Accordingly, the solid-phase heat storage material in the cracks is prevented from being unintentionally released. The nucleation device 2 is activated by the vibrations generated when the internal combustion engine 1 is started. More specifically, the vibrator 26c is released from the equilibrium position by vibrations generated when the internal combustion engine 1 is started so that the lock balls 26a roll to the disengagement position. Then, the hammer 25 released from the standby position moves downward and abuts against the cap member 42. The generated impact causes the target member 23 to abut against the nucleation portion 24 against the urging force of the urging spring 44. The nucleation device 2 is activated in this manner. This opens the cracks in the rear side (lower surface) of the nucleation portion 24 so that crystals of the heat storage material X remaining in the cracks come into direct contact with the heat storage material X or nascent metal surfaces in the cracks come into direct contact with the heat storage material X and nucleates the heat storage material X.

Accordingly, in the third embodiment, the heat storage material X undergoes phase transition from solid to liquid and increases its volume when receiving heat from the cylinder block 11. This moves the piston 21 upward and moves the hammer 25 back to the standby position with the cap member 42. Afterwards, the hammer 25 is restrained in the standby position by the lock mechanism 26 even if the temperature of the heat storage material X in the liquid phase becomes low and decreases the volume of the heat storage material X. Therefore, after the hammer 25, which applies an impact to the nucleation portion 24 and activates the nucleation device 2, is moved downward to the position where the hammer 25 abuts against the target member 41 by means of the cap member, no additional members have to be used to return the hammer 25 to the standby position and prepare it for activating the nucleation device 2 by using the phase transition of the heat storage material X and the heat from the cylinder block 11. Accordingly, this provides a significantly inexpensive but highly efficient nucleation device 2.

A fourth embodiment of the present invention will be described with reference to FIG. 7.

In the fourth embodiment, the structure of the nucleation device is partially modified. Except for the modified part, the remaining structure of the nucleation device is the same as that of the first embodiment. The same components are denoted by the same reference numerals and will not be described in detail.

Figure 7:
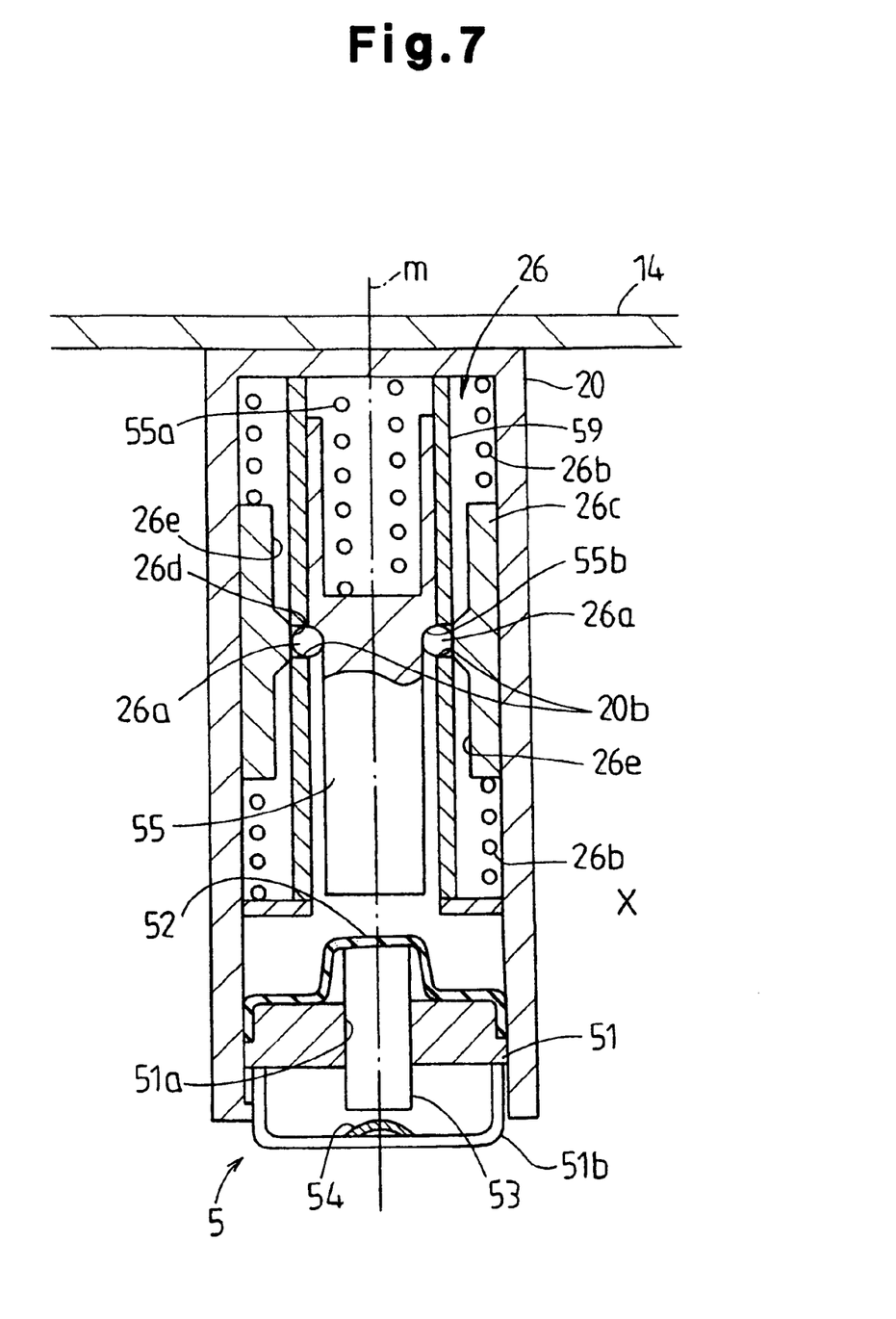
FIG. 7 is a schematic cross-sectional view showing a nucleation device according to a fourth embodiment of the present invention.

As shown in FIG. 7, a nucleation device 5 of the fourth embodiment includes a piston 51 supported at a lower part in the interior of the frame 20 so as to be slidable in the direction of the axis m. A hole 51a extends through the center of the piston 51 in the direction of the axis m. The nucleation device 5 further includes a target member 53, which is cylindrical and supported in a slidable manner in the hole 51a of the piston 51, and a rubber seal member 52, which seals the piston 51 and the target member 53 from the upper part in the frame 20. The nucleation device 5 further includes a nucleation portion 54, which is attached to the piston 51 by an arm 51b and nucleates the heat storage material X by abutting against the lower surface of the target member 53, and a hammer 55, which is supported in a slidable manner in the direction of the axis m in a cylinder 59 having a small diameter and attached to an upper part in the interior of the frame 20 (the region sealed from the heat storage material X by the seal member 52). The hammer 55 abuts against the upper surface of the target member 53 with the seal member 52 arranged in between. The nucleation device 5 further includes an urging spring 55a arranged in a compressed state between the hammer 55 and the upper inner surface of the frame 20 to urge the hammer 55 downward (in the direction for abutting against the target member 53), and a lock mechanism 26 for restraining the hammer 55 in the standby position. The piston 51 and the target member 53 are in contact with the heat storage material X in the heat storage material retainer 14. When the heat storage material X in the liquid phase receives heat from the cylinder block 11 and expands in volume, the piston 51 is moved upward. Further, the target member 53 moves upward in the hole 51a of the piston 51 to move the hammer 55 abutting on the target member 53 to the standby position (the position shown in FIG. 7) against the urging force of the urging spring 55a. In contrast, when the temperature of the heat storage material X in the liquid phase becomes low and the volume of the heat storage material X decreases (for example, by about 2 to 3%), the piston 51 moves downward. The target member 53 then moves downward in the hole 51a of the piston 51 due to its own weight and becomes spaced from the hammer 55.

The nucleation portion 54 is bowl-shape and formed to bulge toward the hammer 55. A plurality of cracks (not shown) filled with crystals of the heat storage material X are formed in the nucleation portion 54 at the side opposite from the hammer 55 (the lower surface as viewed in FIG. 7). When the nucleation device 5 is activated by vibrations generated when the internal combustion engine 1 is started, more specifically, when the vibrator 26c of the lock mechanism 26 is released from the equilibrium position by the vibrations generated when the internal combustion engine 1 is started to allow the lock ball 26a to roll to the disengagement position, the hammer 55 released from the standby position moves downward to abut against the nucleation portion 54 with the target member 53 arranged in between. The nucleation device 5 is activated in this manner, and the cracks on the rear side (the lower surface) of the nucleation portion 54 opened when the hammer 55 abuts against the nucleation portion 54 with the target member 53 arranged in between. As a result, the crystals of the heat storage material X remaining in the cracks come into direct contact with the heat storage material X or nascent metal surfaces in the cracks come into direct contact with the heat storage material X to nucleate the heat storage material X. In this case, the nucleation device 5 is attached with the axis m oriented substantially vertically so that the hammer 55 can be easily released from restraint in the standby position imposed by the lock mechanism 26, that is, the vibrator 26c can be easily released from the equilibrium position by the vibrations generated when the internal combustion engine 1 is started.

Accordingly, in the fourth embodiment, the lock balls 26a slide from the engagement position engaging with the shoulder 55b of the hammer 55 to the disengagement position when the vibrator 26c is released from the equilibrium position by vibrations generated when the internal combustion engine 1 is started. The hammer 55 then moves from the standby position to abut against the target member 53 and open the cracks on the rear side of the nucleation portion 54. As a result, the crystals of the heat storage material X remaining in the cracks come into direct contact with the heat storage material X or the nascent metal surfaces in the cracks come into direct contact with the heat storage material X. This nucleates the heat storage material X. In the fourth embodiment, the nucleation device 5 includes the heat storage material retainer 14 containing the heat storage material X. Thus, in the same manner as the first embodiment, the warm-up apparatus is inexpensive and has a simple structure.

Moreover, when the heat storage material X undergoes phase transition from solid to liquid and increases its volume as it receives heat from the cylinder block 11, the piston 51 and the target member 53 are moved upward and the hammer 55 is returned to the standby position. Subsequently, the hammer 55 is restrained in the standby position by the lock mechanism 26 even if the temperature of the heat storage material X in the liquid phase becomes low and the volume of the heat storage material X decreases. Therefore, after the hammer 55, which nucleates the nucleation portion 54 and activates the nucleation device 5, is moved downward to the position where the hammer 55 abuts against the target member 53, no additional members have to be used to return the hammer 55 to the standby position and prepare it for activating the nucleation device 5 by using the phase transition of the heat storage material X and the heat from the cylinder block 11. Accordingly, this provides a significantly inexpensive but highly efficient nucleation device 5.

A fifth embodiment of the present invention will be described with reference to FIGS. 8 and 9.

In the fifth embodiment, the structure of the nucleation device is partially modified. Except for the modified part, the remaining structure is the same as that of the first embodiment. The same components are denoted by the same reference numerals and will not be described in detail.

Figure 8:
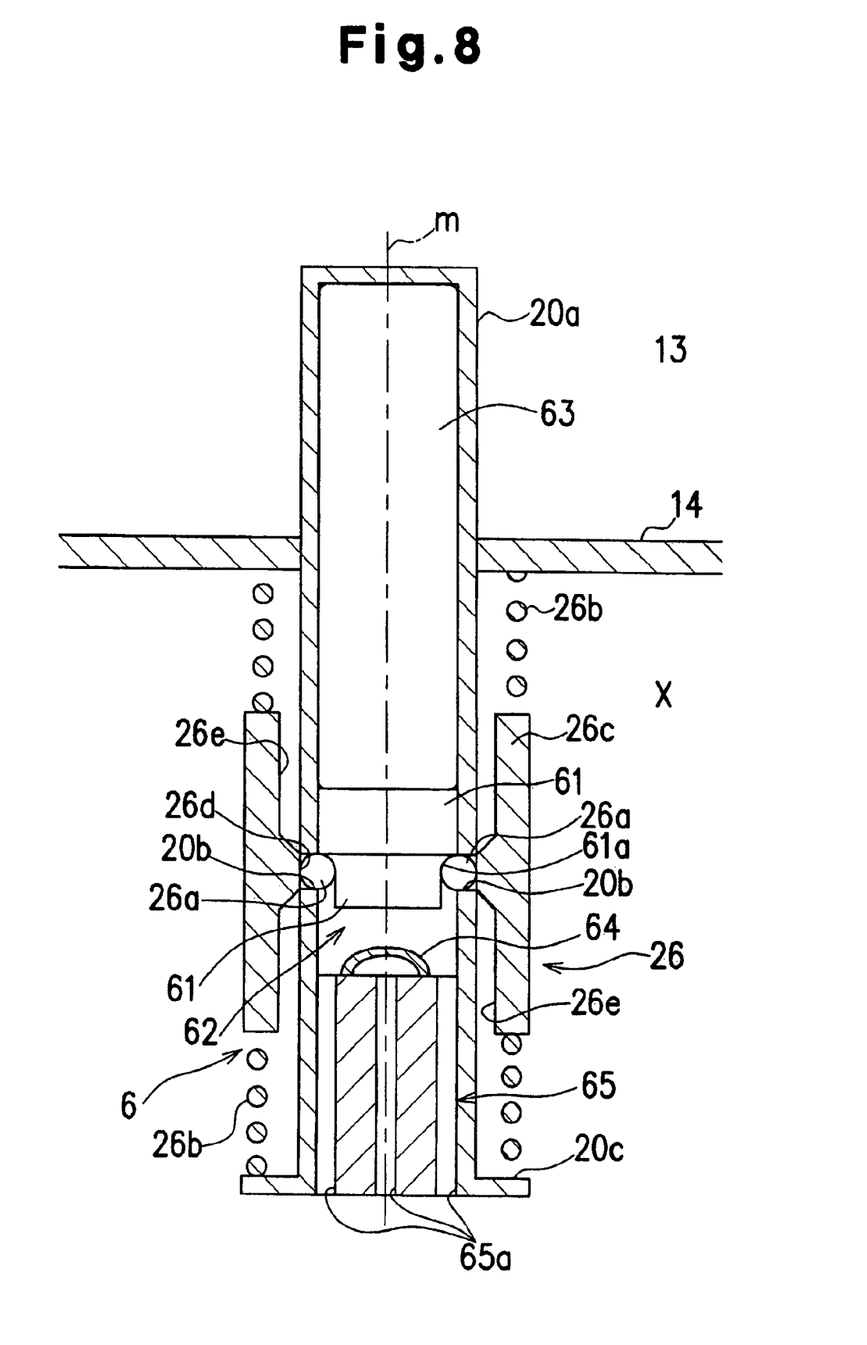
FIG. 8 is schematic cross-sectional view showing a nucleation device according to a fifth embodiment of the present invention.
Figure 9:
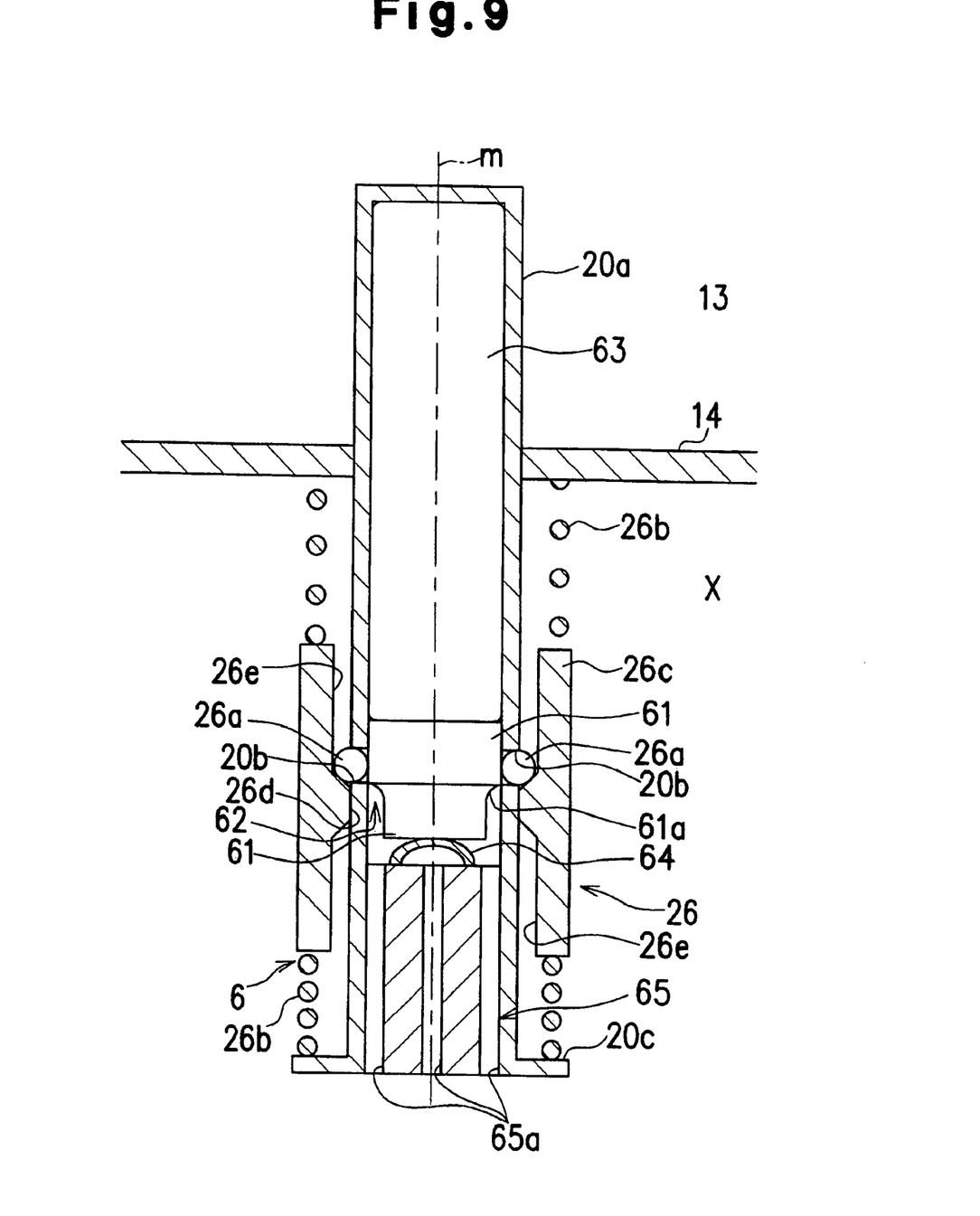
FIG. 9 is a schematic cross-sectional view of the nucleation device showing a nucleating state of the heat storage material of FIG. 8 immediately after starting the engine.

As shown in FIG. 8, in a nucleation device 6 of the fifth embodiment, the upper portion of the cylinder 20a is exposed in the water jacket 13, and the cylinder 20a is attached to extend across the water jacket 13 and the heat storage material retainer 14. In the nucleation device 6, an upper part of the outer surface of the cylinder 20a is in contact with coolant. A lower part of the outer surface of the cylinder 20a is in contact with the heat storage material X. A disk-shaped plate 20c having a larger diameter than the outer diameter of the cylinder 20a is attached to the lower end of the cylinder 20a.

The nucleation device 6 has a lock mechanism 62 for restraining the hammer 61 in the standby position. The lock mechanism 62 is arranged in the cylinder 20a at the upper side of the hammer 61. The lock mechanism 62 includes an air bag 63 functioning as an air chamber urging the hammer 61 downward with compressed air, lock balls 26a arranged in the wall surface of the cylinder 20a and supported in a rollable manner in holes 20b extending through the wall in a radial direction orthogonal to the axis m, and a vibrator 26c. The lock balls 26a roll in the holes 20b between a radially inner engagement position (the position shown in FIG. 8) where the lock balls 26a are engaged with a shoulder 61a of the hammer 61 in the standby position of the hammer 25 and a radially outer disengagement position (the position shown in FIG. 9) where the lock ball 26a is disengaged from the shoulder 61a of the hammer 61. The vibrator 26c is held in equilibrium between a plate 20c attached to the lower end of the cylinder 20a and the lower surface of the heat storage material retainer 14 by the urging force of a pair of upper and lower urging springs 26b and 26b such that the vibrator 26c is movable in the direction of the axis m. The vibrator 26c is released from the equilibrium state (the position shown in FIG. 8) established by the urging springs 26b by vibrations generated when the internal combustion engine 1 is started and swings in the direction of the axis m relatively to the internal combustion engine 1.

A nucleation portion 64 is bowl-shaped and bulged toward the hammer 61. A plurality of cracks (not shown) filled with crystals of the heat storage material X are formed on the side of the nucleation portion 64 opposite from the hammer 61 (the lower surface as viewed in FIG. 2). The nucleation portion 64 is mounted on a mounting base 65 so that the nucleation portion 64 is in contact and communication with the heat storage material X in the heat storage material retainer 14 through a plurality of holes 65a, 65a, . . . extending through the mounting base 65 in the direction of the axis m. Referring to FIG. 9, the nucleation device 6 is activated by vibrations generated when the internal combustion engine 1 is started. More specifically, the vibrator 26c is released from the equilibrium position by vibrations generated when the internal combustion engine 1, and the lock balls 26a roll to the release position. The hammer 61 is thus released from the standby position and moved downward to abut against the nucleation portion 64. This activates the nucleation device 6 and open the cracks on the rear side (the lower surface) of the nucleation portion 64. As a result, the crystals of the heat storage material X remaining in the cracks come into direct contact with the heat storage material X or nascent metal surfaces in the cracks come into direct contact with the heat storage material X. This nucleates the heat storage material X. In this case, the nucleation device 6 is installed with the axis m oriented substantially vertically so that the hammer 61 can easily be released from the restraint in the standby position by the lock mechanism 62, that is, the vibrator 26c can easily be released from the equilibrium position by the vibrations generated when the internal combustion engine 1 is started.

When the heat storage material X undergoes phase transition from solid to liquid and increases volume as its receives heat from the cylinder block 11, the hammer 61 is moved upward against the urging force of the air in the air bag 63 by the heat storage material X flowing through the holes 65a, 65a, . . . in the mounting base 65 so as to be held in the standby position by the lock mechanism 62. In this case, the air in the air bag 63 is sealed in the air bag 63 and compressed by the upward movement of the hammer 61 caused by the increase in volume of the heat storage material X so as to urge the hammer 61 downward.

Accordingly, in the fifth embodiment, when the vibrator 26c is released from the equilibrium position by vibrations generated when the internal combustion engine 1 is started, the lock balls 26a roll from the engagement position where the lock balls 26a are engaged with the shoulder 61a of the hammer 61 to the disengagement position. The hammer 61 then moves from the standby position to abut against the surface of the nucleation portion 64. This opens the cracks on the rear side of the nucleation portion 64. As a result, the crystals of the heat storage material X remaining in the cracks come into direct contact with the heat storage material X or the nascent metal surfaces in the cracks come into direct contact with the heat storage material X. This nucleates the heat storage material X. In the fifth embodiment, the nucleation device 6 is arranged in the heat storage material retainer 14 containing the heat storage material X. Therefore, in the same manner as the first embodiment, the warm-up apparatus is inexpensive and has a simple structure.

Moreover, when the heat storage material X undergoes phase transition from solid to liquid and increases its volume when receiving heat from the cylinder block 11, the hammer 61 is moved back to the standby position. Subsequently, the hammer 61 is restrained in the standby position by the lock mechanism 62 even if the temperature of the heat storage material X in the liquid phase becomes low and the volume of the heat storage material X decreases. Therefore, after the hammer 61, which activates the nucleation device 6, is moved downward to the abutment position, no additional members have to be used to return the hammer 61 to the standby position and prepare it for activating the nucleation device 6 by using the phase transition of the heat storage material X and the heat from the cylinder block 11. Accordingly, this provides a significantly inexpensive but highly efficient nucleation device 6.

The present invention is not limited to the embodiments described above and includes other various modifications. For example, in the first to fifth embodiments described above, the heat storage material X is nucleated by bringing the crystals of the heat storage material X remaining in the cracks on the rear side of the nucleation portion 24, 54, 64 or the nascent metal surfaces in the cracks into direct contact with the heat storage material X. However, the mechanism for nucleating the heat storage material is not limited in such a manner. For example, a rod-shaped shaft member may be moved by vibrations generated when the internal combustion engine is started so that a scraping member scrapes the surface of the shaft member to form a nascent surface on the surface of the shaft member. The nascent surface may then be brought into direct contact with the heat storage material to nucleate the heat storage material in a supercooled state. It is obvious that other various mechanisms may be used to nucleate the heat storage material.

In the above embodiments, the heat storage material retainer 14 is arranged in the water jacket 13. However, a special accommodation chamber may be formed in the cylinder block to accommodate the heat storage material retainer.

Further, in the fifth embodiment, the air bag 63 filled with air to urge the hammer 61 downward does not necessarily have to be used as the air chamber. For example, an air chamber formed by a copper bellows with air sealed therein may be formed in the cylinder above the hammer.

The invention claimed is:

1. A warm-up apparatus for an internal combustion engine, the warm-up apparatus comprising:
    a latent heat type heat storage material accommodated in the internal combustion engine, undergoing phase transition between a liquid phase including a supercooled state and a solid phase, and increasing volume as temperature increases in the liquid phase; and
    a nucleation device arranged in the heat storage material and operated to accelerate phase transition of the heat storage material in the supercooled state to release heat, wherein the nucleation device includes:
        a nucleation portion for nucleating and changing the phase of the heat storage material in the supercooled state;
        a hammer movable toward the nucleation portion and away from the nucleation portion along a predetermined axial direction;
        a target member for applying impact to the nucleation portion by abutting against the hammer when the hammer moves forward in a first direction along the axial direction;
        a spring urging the hammer in the first direction along the axial direction, the spring being compressed when the hammer moves backward in a second direction along the axial direction by making use of the increase in the volume of the heat storage material when heat is received from the internal combustion engine and phase transition from the solid phase to the liquid phase occurs; and
        a lock mechanism restraining the hammer at a predetermined position in the axial direction in a state in which the spring is compressed when the temperature of the heat storage material in the liquid phase is low and the volume of the heat storage material is decreased, the lock mechanism being released by vibrations generated when the internal combustion engine is started so that the hammer is abutted against the target member by the urging force of the spring to apply an impact to the nucleation portion in order to activate the nucleation device and cause phase transition of the heat storage material in the supercooled state.

2. A warm-up apparatus for an internal combustion engine, the warm-up apparatus comprising:
    a latent heat type heat storage material accommodated in the internal combustion engine, undergoing phase transition between a liquid phase including a supercooled state and a solid phase, and increasing volume as temperature increases in the liquid phase; and
    a nucleation device arranged in the heat storage material and operated to accelerate phase transition of the heat storage material in the supercooled state to release heat, wherein the nucleation device includes:
        a nucleation portion for nucleating and changing the phase of the heat storage material in the supercooled state;
        a hammer movable toward the nucleation portion and away from the nucleation portion along a predetermined axial direction, the hammer applying impact to the nucleation portion when moving forward in a first direction along the axial direction;
        an air chamber urging the hammer in the first direction along the axial direction with air compressed therein, the air in the air chamber being compressed when the hammer is moved backward in a second direction along the axial direction by making use of the increase in the volume of the heat storage material when heat is received from the internal combustion engine and the phase transition occurs from the solid phase to the liquid phase; and
        a lock mechanism restraining the hammer in a predetermined position along the axial direction in a state in which the air in the air chamber is compressed when the temperature of the heat storage material in the liquid phase is low and the volume of the heat storage material is decreased, the lock mechanism being released by vibrations generated when the internal combustion engine is started so that the hammer is abutted against the nucleation portion by the urging force of the air compressed in the air chamber to apply an impact to the nucleation portion in order to activate the nucleation device and cause phase transition of the heat storage material in the supercooled state.

3. The warm-up apparatus for an internal combustion engine according to claim 1, wherein the lock mechanism includes:
    a vibrator arranged at the outer side of the hammer in a direction orthogonal to the axial direction and being swingable in the axial direction; and
    an elastic body holding the vibrator in an equilibrium position located at the center of swing;
    wherein the vibrator is moved away from the equilibrium position by being swung in the axial direction by vibrations generated when the internal combustion engine is started in order to release the hammer from restraint at the predetermined position.

4. The warm-up apparatus for an internal combustion engine according to claim 3, wherein:

the lock mechanism includes a lock ball rollable in a direction orthogonal to the axial direction, the lock ball rolling between an engagement position where the lock ball is engaged with the hammer to restrain the hammer at the predetermined position and a disengagement position where the lock ball is disengaged from the hammer;

the vibrator includes a projection projecting toward the hammer along a direction orthogonal to the axial direction; and the projection restrains the hammer in the predetermined position by abutting against and holding the lock ball at the engagement position when the vibrator is held at the equilibrium position, and the projection releases the hammer from restraint at the predetermined position by disengaging the lock ball from the projection and rolling the lock ball to the disengagement position when the vibrator is moved away from the equilibrium position by vibrations generated when the internal combustion engine is started.

5. The warm-up apparatus for an internal combustion engine according to claim 2, wherein the air chamber includes either an air bag having air sealed therein or a copper bellows.

6. The warm-up apparatus for an internal combustion engine according to claim 2, wherein the lock mechanism includes:

a vibrator arranged at the outer side of the hammer in a direction orthogonal to the axial direction and being swingable in the axial direction; and an elastic body holding the vibrator in an equilibrium position located at the center of swing;

wherein the vibrator is moved away from the equilibrium position by being swung in the axial direction by vibrations generated when the internal combustion engine is started in order to release the hammer from restraint at the predetermined position.

7. The warm-up apparatus for an internal combustion engine according to claim 6, wherein:

the lock mechanism includes a lock ball rollable in a direction orthogonal to the axial direction, the lock ball rolling between an engagement position where the lock ball is engaged with the hammer to restrain the hammer at the predetermined position and a disengagement position where the lock ball is disengaged from the hammer;

the vibrator includes a projection projecting toward the hammer along a direction orthogonal to the axial direction; and the projection restrains the hammer in the predetermined position by abutting against and holding the lock ball at the engagement position when the vibrator is held at the equilibrium position, and the projection releases the hammer from restraint at the predetermined position by disengaging the lock ball from the projection and rolling the lock ball to the disengagement position when the vibrator is moved away from the equilibrium position by vibrations generated when the internal combustion engine is started.

\* \* \* \* \*

UNITED STATES PATENT AND TRADEMARK OFFICE
CERTIFICATE OF CORRECTION

PATENT NO. : 7,730,863 B2  Page 1 of 1
APPLICATION NO. : 11/662571
DATED : June 8, 2010
INVENTOR(S) : Shikida

It is certified that error appears in the above-identified patent and that said Letters Patent is hereby corrected as shown below:

On the title page, Item (86), the PCT information is incorrect. Item (86) should read:
-- (86) PCT No.: PCT/JP2006/316379

§371 (c) (1),
(2), (4) Date: Mar. 12, 2007 --

Signed and Sealed this

Fourteenth Day of September, 2010

David J. Kappos
*Director of the United States Patent and Trademark Office*